United States Patent
Ma

(10) Patent No.: US 11,181,171 B2
(45) Date of Patent: Nov. 23, 2021

(54) ENDLESS DRIVE ARRANGEMENT AND TENSIONING SYSTEM FOR SAME

(71) Applicant: LITENS AUTOMOTIVE PARTNERSHIP, Woodbridge (CA)

(72) Inventor: Wei Ma, Richmond Hill (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 269 days.

(21) Appl. No.: 16/305,738

(22) PCT Filed: May 30, 2017

(86) PCT No.: PCT/CA2017/050660
§ 371 (c)(1),
(2) Date: Nov. 29, 2018

(87) PCT Pub. No.: WO2017/205976
PCT Pub. Date: Dec. 7, 2017

(65) Prior Publication Data
US 2019/0285148 A1    Sep. 19, 2019

Related U.S. Application Data

(60) Provisional application No. 62/377,561, filed on Aug. 20, 2016, provisional application No. 62/343,105, filed on May 30, 2016.

(51) Int. Cl.
*F16H 7/12* (2006.01)
*F02B 67/06* (2006.01)
(Continued)

(52) U.S. Cl.
CPC ........... *F16H 7/1245* (2013.01); *B60K 25/02* (2013.01); *F02B 67/06* (2013.01); *F16H 7/0838* (2013.01);
(Continued)

(58) Field of Classification Search
CPC ........... F16H 2007/0874; F16H 7/1281; F16H 2007/081; F16H 2007/0806; F16H 7/129; F02B 67/06
(Continued)

(56) References Cited

U.S. PATENT DOCUMENTS 315,735 A *   4/1885  Colburn ..................... 474/134
976,115 A *  11/1910  Bard ........................... 474/134
(Continued)

FOREIGN PATENT DOCUMENTS

CA    2910627 A1   4/2016
CN    1802525 A    7/2006
(Continued)

OTHER PUBLICATIONS

Office Action for CN201680008671 dated Jan. 24, 2019.
(Continued)

*Primary Examiner* — Henry Y Liu
(74) *Attorney, Agent, or Firm* — Millman IP Inc.

(57) ABSTRACT

In an aspect, a tensioner is provided for tensioning a belt on an engine, and includes a base mountable to a stationary member, and a first tensioner arm pivotably connected to the base. The first tensioner arm is biased in a first pivot direction. The tensioner includes a first bumper on one of the base and the first tensioner arm, which is engageable with a first travel limiter on the other of the base and the first tensioner arm to limit travel of the first tensioner arm in a second pivot direction, and a first pulley rotatably mounted to the first tensioner arm and positioned to engage a first section of the belt. The first bumper and the first travel limiter together have a selected first combined spring rate during engagement. The first combined spring rate increases progressively with compression between the first bumper and the first travel limiter.

15 Claims, 12 Drawing Sheets

(51) Int. Cl.
*F16H 7/08* (2006.01)
*F16H 7/18* (2006.01)
*B60K 25/02* (2006.01)

(52) U.S. Cl.
CPC .............. *F16H 7/12* (2013.01); *F16H 7/18* (2013.01); *F16H 2007/0865* (2013.01); *F16H 2007/0874* (2013.01); *F16H 2007/0893* (2013.01); *F16H 2007/0897* (2013.01)

(58) Field of Classification Search
USPC ......................................................... 474/134
See application file for complete search history.

(56) References Cited

U.S. PATENT DOCUMENTS

| | | | | |
|---|---|---|---|---|
| 1,805,326 | A * | 5/1931 | Bunker | F16H 7/1281 474/132 |
| 1,848,423 | A * | 3/1932 | Jackson | D01H 1/241 474/134 |
| 1,871,268 | A * | 8/1932 | Hildebrand | F02D 1/00 474/134 |
| 2,066,721 | A * | 1/1937 | Eaton | F16H 7/1281 474/109 |
| 2,425,476 | A * | 8/1947 | Frederick | D06F 53/04 211/119.09 |
| 2,639,623 | A * | 5/1953 | Ausherman | F16H 7/1281 474/134 |
| 2,766,417 | A * | 10/1956 | Merritt | H02K 23/66 318/475 |
| 2,875,842 | A * | 3/1959 | Morrell | B66F 9/07568 180/291 |
| 2,945,393 | A * | 7/1960 | Paulson | F16H 7/1281 477/7 |
| 2,954,726 | A * | 10/1960 | Norman | F16H 7/1281 404/117 |
| 3,575,058 | A * | 4/1971 | Kraus | F16H 7/1281 474/29 |
| RE27,861 | E * | 1/1974 | Kraus | F16H 9/16 474/29 |
| 4,511,348 | A * | 4/1985 | Witdoek | F16H 7/12 474/109 |
| 4,564,098 | A * | 1/1986 | Hormann | E05F 15/668 192/150 |
| 4,758,208 | A * | 7/1988 | Bartos | F16H 7/1281 474/135 |
| 5,435,100 | A * | 7/1995 | Kuisis | G07F 17/145 49/46 |
| 5,776,025 | A * | 7/1998 | Labudde | F16H 7/1281 474/133 |
| 6,511,393 | B1 * | 1/2003 | Bogl | F01L 1/024 474/101 |
| 6,609,989 | B2 * | 8/2003 | Bogner | F02B 63/04 474/134 |
| 6,648,783 | B1 * | 11/2003 | Bogner | F16H 7/1281 474/134 |
| 6,689,001 | B2 * | 2/2004 | Oliver | F16H 7/1281 474/134 |
| 6,821,223 | B2 * | 11/2004 | Henry | F01L 1/34 474/109 |
| 6,830,524 | B2 * | 12/2004 | Tamai | F16H 7/1281 474/111 |
| 6,942,589 | B2 * | 9/2005 | Rogers | F16H 7/12 474/134 |
| 6,960,145 | B2 * | 11/2005 | Fraley, Jr. | B62D 5/0424 180/444 |
| 7,032,349 | B2 * | 4/2006 | Oberheide | E05F 15/60 49/360 |
| 7,419,447 | B2 * | 9/2008 | Serkh | F16H 7/1218 474/117 |
| 7,468,013 | B2 * | 12/2008 | Di Giacomo | F16H 7/1281 474/134 |
| 7,494,434 | B2 * | 2/2009 | Vicar | F16H 7/1281 474/101 |
| 7,648,436 | B2 * | 1/2010 | Horst | F16H 19/06 474/134 |
| 7,699,731 | B2 * | 4/2010 | Bicchi | F16H 35/008 474/134 |
| 7,892,125 | B2 * | 2/2011 | Nelson | F16H 7/1254 474/134 |
| 7,901,310 | B2 * | 3/2011 | Lolli | F16H 7/1281 474/134 |
| 8,353,795 | B2 * | 1/2013 | Montani | F16H 7/1281 474/134 |
| 8,439,780 | B2 * | 5/2013 | Ruffini | F16H 7/1281 474/112 |
| 8,591,358 | B2 | 11/2013 | Fischer | |
| 8,602,930 | B2 | 12/2013 | Deneszczuk et al. | |
| 8,821,328 | B2 * | 9/2014 | Jud | F16H 7/1281 474/134 |
| 9,097,314 | B2 | 8/2015 | Wolf et al. | |
| 9,133,762 | B2 | 9/2015 | Macguire et al. | |
| 9,151,366 | B2 | 10/2015 | Antchak et al. | |
| 9,341,243 | B2 | 5/2016 | Replete et al. | |
| 9,528,576 | B2 * | 12/2016 | Anstey | F16H 7/00 |
| 2002/0039943 | A1 * | 4/2002 | Serkh | F16H 7/1218 474/134 |
| 2002/0086751 | A1 * | 7/2002 | Bogner | F02B 67/06 474/134 |
| 2003/0109342 | A1 * | 6/2003 | Oliver | F16H 7/1281 474/134 |
| 2003/0153421 | A1 * | 8/2003 | Liu | F16H 7/1209 474/134 |
| 2003/0216203 | A1 * | 11/2003 | Oliver | F16H 7/1281 474/134 |
| 2004/0043854 | A1 * | 3/2004 | Fraley, Jr. | F16H 7/1281 474/134 |
| 2004/0072642 | A1 * | 4/2004 | Serkh | F16H 7/1218 474/134 |
| 2004/0077446 | A1 | 4/2004 | Manning | |
| 2006/0100051 | A1 * | 5/2006 | Di Giacomo | F16H 55/171 474/170 |
| 2006/0217222 | A1 * | 9/2006 | Lolli | F02B 67/06 474/134 |
| 2006/0287146 | A1 * | 12/2006 | McVicar | F16H 7/1281 474/109 |
| 2007/0037648 | A1 * | 2/2007 | Di Giacomo | F02B 67/06 474/134 |
| 2007/0155559 | A1 * | 7/2007 | Horst | F16H 19/005 474/134 |
| 2008/0214342 | A1 * | 9/2008 | Montani | F02B 67/06 474/134 |
| 2009/0069134 | A1 * | 3/2009 | Kuo | F16H 7/1281 474/134 |
| 2009/0298631 | A1 | 12/2009 | Jud et al. | |
| 2011/0070986 | A1 * | 3/2011 | Maguire | F02B 67/06 474/135 |
| 2013/0040770 | A1 * | 2/2013 | Wolf | F16H 7/1281 474/134 |
| 2013/0079185 | A1 | 3/2013 | Schauerte et al. | |
| 2013/0172137 | A1 | 7/2013 | Antchak et al. | |
| 2013/0260932 | A1 | 10/2013 | Adam et al. | |
| 2014/0256488 | A1 | 9/2014 | Wolf et al. | |
| 2014/0315673 | A1 | 10/2014 | Zacker et al. | |
| 2015/0051033 | A1 * | 2/2015 | Replete | F16H 7/1209 474/117 |
| 2015/0060232 | A1 | 3/2015 | Tran et al. | |
| 2015/0167797 | A1 * | 6/2015 | Noguchi | F02N 11/0814 477/3 |
| 2015/0345597 | A1 * | 12/2015 | Walter | F02B 67/06 474/134 |
| 2015/0369347 | A1 * | 12/2015 | Wolf | F16H 7/1281 474/134 |
| 2017/0074375 | A1 | 3/2017 | Ryeland et al. | |

(56) References Cited

U.S. PATENT DOCUMENTS

| | | | |
|---|---|---|---|
| 2017/0306836 A1 | 10/2017 | Replete et al. | |
| 2017/0363182 A1 | 12/2017 | Ryeland et al. | |

FOREIGN PATENT DOCUMENTS

| | | |
|---|---|---|
| CN | 102022495 A | 4/2011 |
| CN | 102954167 A | 3/2013 |
| CN | 104220780 A | 12/2014 |
| DE | 19849659 A1 | 5/2000 |
| DE | 102005039719 A1 | 3/2007 |
| DE | 202008002279 U1 | 4/2008 |
| DE | 102007042501 A1 | 3/2009 |
| DE | 102013203957 B3 | 2/2014 |
| DE | 102013206010 B3 | 8/2014 |
| DE | 102013005884 A1 | 10/2014 |
| DE | 102015205804 A1 | 10/2015 |
| EP | 2128489 B1 | 8/2011 |
| EP | 2557295 A2 | 2/2013 |
| WO | 2001079727 A2 | 10/2001 |
| WO | 2004059192 A1 | 7/2004 |
| WO | 2004099650 A1 | 11/2004 |
| WO | 2012061930 A1 | 5/2012 |
| WO | 2013142951 A1 | 10/2013 |
| WO | 2013159181 A1 | 10/2013 |
| WO | 2014100894 A1 | 7/2014 |
| WO | 2015027325 A1 | 3/2015 |
| WO | 2015070329 A1 | 5/2015 |
| WO | 2016061685 A1 | 4/2016 |
| WO | 2016132054 A1 | 8/2016 |

OTHER PUBLICATIONS

Office Action for CN201680008671 dated Jan. 24, 2019—English translation.
Arc Spring Alternator Mounted Tensioner—Feb. 15, 2015.
Cellasto Components Complete Industrial Products (Brochure) dated Apr. 10, 2015, BASF (http://www.polyurethanes.basf.com/pu/Cellasto/).
Dynamics and Stability of Mechanical Systems with Follower Forces, Nov. 1971, George Hermann (Standford University, NASA).
EP2557295—English translation.
Extended European Search Report for EP113152 dated Nov. 9, 2018.
Extended European Search Report for EP15852561 dated Apr. 30, 2018.
International Search Report and Written Opinion for PCT/CA2017/050660 dated Sep. 15, 2017.
International Search Report and Written Opinion for PCT/CA2017/050954 dated Nov. 9, 2017.
ISR & WO for PCT/CA2016/050113 dated Aug. 17, 2017.
ISR & WO for PCT/CA2015/051067 dated Feb. 3, 2016.
Office Action for CN201580057155 dated Dec. 3, 2018.
Office Action for CN201580057155 dated Dec. 3, 2018—English translation.
EP Search Report for EP Application No. 17805447.4 dated Nov. 4, 2019.
Office Action for U.S. Appl. No. 15/696,994 dated Sep. 30, 2019.
Office Action for U.S. Appl. No. 15/545,808 dated Feb. 24, 2020.
Final Office Action for U.S. Appl. No. 15/696,994 dated Apr. 1, 2020.
EESR for EP17838270.1 dated Jun. 19, 2020.
Office Action for JP201 9-507307 dated May 31, 2021.

* cited by examiner

ENDLESS DRIVE ARRANGEMENT AND TENSIONING SYSTEM FOR SAME

CROSS-REFERENCE TO RELATED APPLICATIONS

This application claims the benefit of U.S. Provisional Patent application 62/343,105 filed May 30, 2016, and of U.S. Provisional Patent application 62/377,561 filed Aug. 20, 2016, the contents of both of which are incorporated herein in their entirety.

FIELD OF THE DISCLOSURE

This disclosure relates generally to the art of endless drive arrangements and more particularly to systems for vehicular front engine accessory drive arrangements that employ a motor/generator unit or other secondary motive unit in addition to an engine and a two-armed tensioner.

BACKGROUND

Vehicular engines typically employ a front engine accessory drive to transfer power to one or more accessories, such as an alternator, an air conditioner compressor, a water pump and various other accessories. Some vehicles are hybrids and employ both an internal combustion engine, along with an electric drive. There are many possible configurations of such vehicles. For example, in some configurations, the electric motor is used to assist the engine in driving the vehicle (i.e. the electric motor is used to temporarily boost the amount of power being sent to the driven wheels of the vehicle). In some configurations, the electric motor is used to drive the driven wheels of the vehicle by itself and only after the battery is exhausted to a sufficient level does the engine turn on to take over the function of driving the vehicle.

While hybrid vehicles are advantageous in terms of improved fuel economy, their operation can result in higher stresses and different stresses on certain components such as the belt from the front engine accessory drive, which can lead to a reduction in the operating life of these components. It would be advantageous to provide improved operating life for components of the front engine accessory drive in a hybrid vehicle.

SUMMARY

In an aspect, a tensioner is provided for tensioning a belt on an engine. The tensioner includes a base that is mountable to a stationary member, and a first tensioner arm that is pivotably connected to the base. The first tensioner arm is biased in a first pivot direction for the first tensioner arm. The tensioner further includes a first bumper on one of the base and the first tensioner arm, which is engageable with a first travel limiter on the other of the base and the first tensioner arm to limit travel of the first tensioner arm in a second pivot direction for the first tensioner arm, and a first pulley rotatably mounted to the first tensioner arm and positioned to engage a first section of the belt. The first bumper and the first travel limiter together have a selected first combined spring rate during engagement with one another. The first combined spring rate increases progressively with compression between the first bumper and the first travel limiter.

In another aspect, a tensioner is provided for tensioning a belt in an engine. The tensioner includes a base that is mountable to a stationary member, and a first tensioner arm that is pivotably connected to the base. The first tensioner arm is biased in a first pivot direction for the first tensioner arm. A first bumper is held in a first bumper receptacle on one of the base and the first tensioner arm, and a first travel limiter on the other of the base and the first tensioner arm. A first pulley is rotatably mounted to the first tensioner arm and positioned to engage a first section of the belt. The first bumper has a proximal portion that is captured in the first bumper receptacle, and a distal portion on which there is a distal face that is engageable with the first travel limiter to limit travel of the first tensioner arm in a second pivot direction for the first tensioner arm, wherein the first bumper has a longitudinal axis extending from the proximal portion to the distal face. The distal portion is spaced laterally from a side wall of the first bumper receptacle by a gap sized to limit lateral growth of the first bumper during compression of the first bumper. The gap increases in size in a distal direction.

A method is provided for reducing peak hubloads in an endless drive arrangement for an engine, including a belt, a crankshaft that is driven by the engine to drive the belt, at least one accessory that is driven by the belt, and a tensioner including a base, a first tensioner arm that is movable relative to the base, a first pulley rotatably mounted on the tensioner arm and a tensioner biasing member that biases the first tensioner arm in a first free arm direction, the method comprising:

a) providing a first bumper on one of the base and the first tensioner arm;

b) providing a first travel limiter on the other of the base and the first tensioner arm; and c) moving the first tensioner arm relative to the base in a direction opposite to the first free arm direction, such that the bumper and the travel limiter engage one another, wherein the first bumper and the first travel limiter together have a selected first combined spring rate during engagement with one another, wherein the first combined spring rate increases progressively with compression between the first bumper and the first travel limiter.

Other features and methods described in the present disclosure are contemplated to be novel and inventive over the prior art and to be protected by way of the present patent application.

BRIEF DESCRIPTION OF THE DRAWINGS

The foregoing and other aspects of the invention will be better appreciated with reference to the attached drawings, wherein.

DETAILED DESCRIPTION OF EXAMPLE EMBODIMENTS

In the figures, certain variants of a tensioner and elements thereof are shown. However, in situations where the functions of the elements are the same, the same reference numbers are used to identify these elements.

Figure 1:
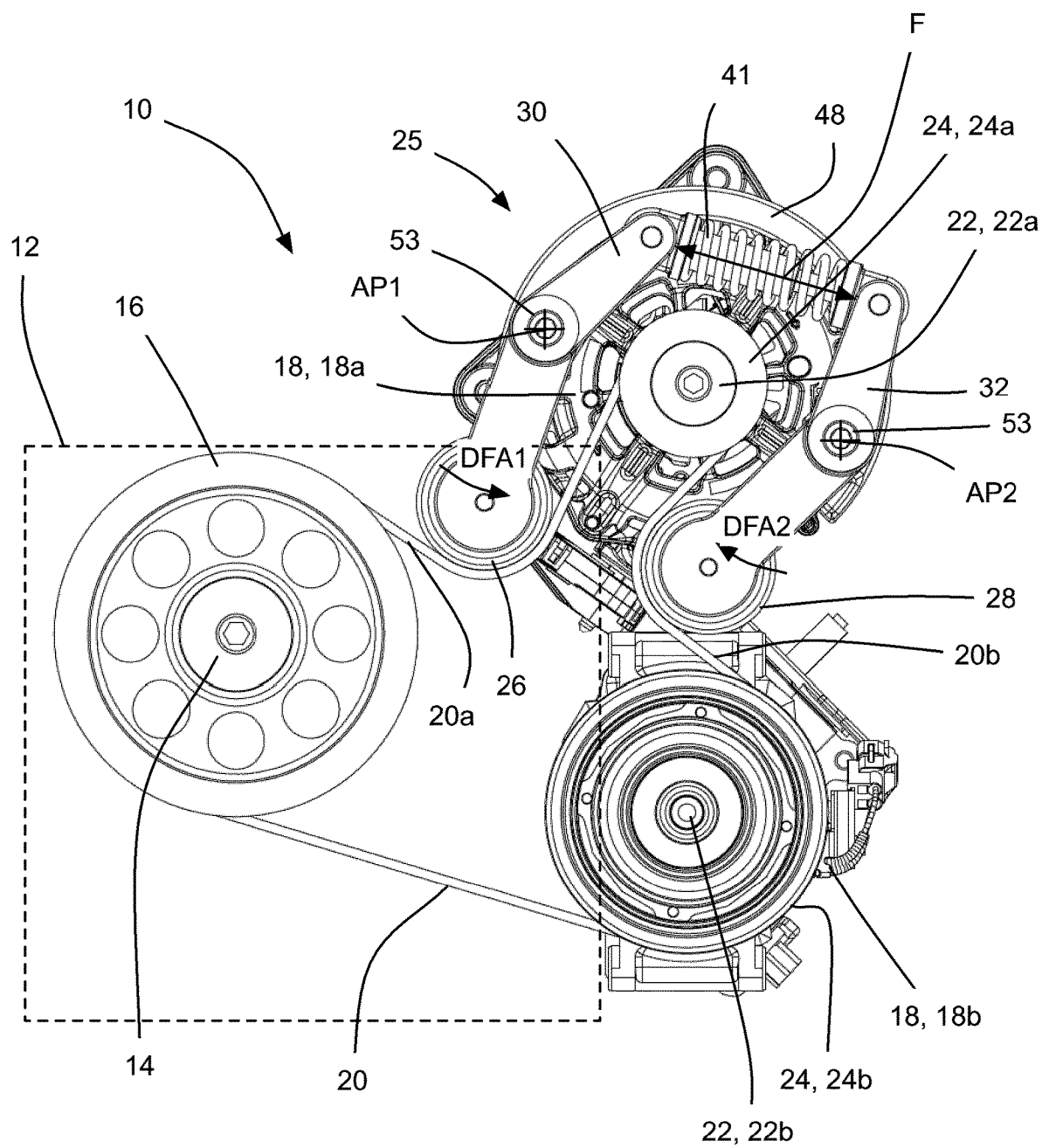
FIG. 1 is a plan view of an endless drive arrangement including a tensioner, in accordance with an embodiment of the present disclosure.

FIG. 1 shows an endless drive arrangement 10 for an engine, schematically represented by a dashed-line rectangle and shown at 12. In embodiments wherein the engine 12 is mounted in a vehicle, the endless drive arrangement 10 may be a front engine accessory drive. The engine 12 includes a crankshaft 14 that has a crankshaft pulley 16 mounted thereon. The crankshaft pulley 16 is drivable by the crankshaft 14 of the engine 12 and itself drives one or more vehicle accessories 18 via an endless drive member 20, such as a belt. For convenience the endless drive member 20 will be referred to as a belt 20, however it will be understood that it could be any other type of endless drive member. The accessories 18 may include a motor-generator unit (MGU) 18a, an air conditioning compressor 18b, a water pump (not shown), a power steering pump (not shown) and/or any other suitable accessory.

In FIG. 1, two accessories 18 are shown, however there could be more or fewer accessories. Each of the driven accessories has a drive shaft 22 and a pulley 24. The MGU 18a has an MGU drive shaft 22a and an MGU pulley 24a.

As can be seen in FIG. 1, the belt 20 is engaged with the crankshaft pulley 16 and the MGU pulley shown at 24a (and the other accessory pulleys 24). Under normal operating conditions the endless drive arrangement 10 is operable in a first mode in which the endless drive arrangement 10 may be driven by the engine 12, and in turn drives the pulleys 24 of the accessories 18. In the first mode, the tension in the first belt span 20a is lower than the tension in the second belt span 20b. The MGU 18a may be operable as an alternator in the first mode, in order to charge the vehicle's battery (not shown).

The MGU 18a is also operable as a motor, wherein it drives the MGU pulley 24a, which in turn drives the belt 20. During such events where the MGU 18a is operated as a motor, the endless drive arrangement 10 may be considered to be operable in a second mode, in which the tension in the second belt span 20b is lower than the tension in the first belt span 20a. This may be during a 'boost' event when the engine is driving the wheels of the vehicle, but additional power is desired to supply further power to the wheels indirectly by transferring power to the engine's crankshaft 14 via the belt 20. Another situation in which the MGU 18a is operated as a motor include a BAS (Belt-Alternator Start) event, in which the MGU 18a drives the belt 20 in order to cause rotation of the crankshaft 14, and thereby start the engine 12. Yet another situation in which the MGU 18a is operated as a motor is an ISAF (Idle/Stop Accessory Function) event, when the MGU 18a is used to drive the belt 20 in order to drive one or more accessories when the engine is off (e.g. in some hybrid vehicles where the engine is turned off automatically when the vehicle is at a stoplight or is otherwise stopped briefly).

In the present disclosure, the span 20a of the belt 20 may be referred to at the belt span 20a, and the span 20b of the belt 20 may be referred to as the belt span 20b.

It will be noted that the MGU 18a is but one example of a secondary drive device that can be used as a motor to drive the belt 20 for any of the purposes ascribed above to the MGU 18a. In an alternative example, the accessory 18a may be a typical alternator and a separate electric motor may be provided adjacent to the alternator (either upstream or downstream on the belt 20 from the alternator) to driving the belt 20 when it is desired to boost acceleration of the vehicle, in BAS operation, and/or in ISAF operation.

Figure 4:
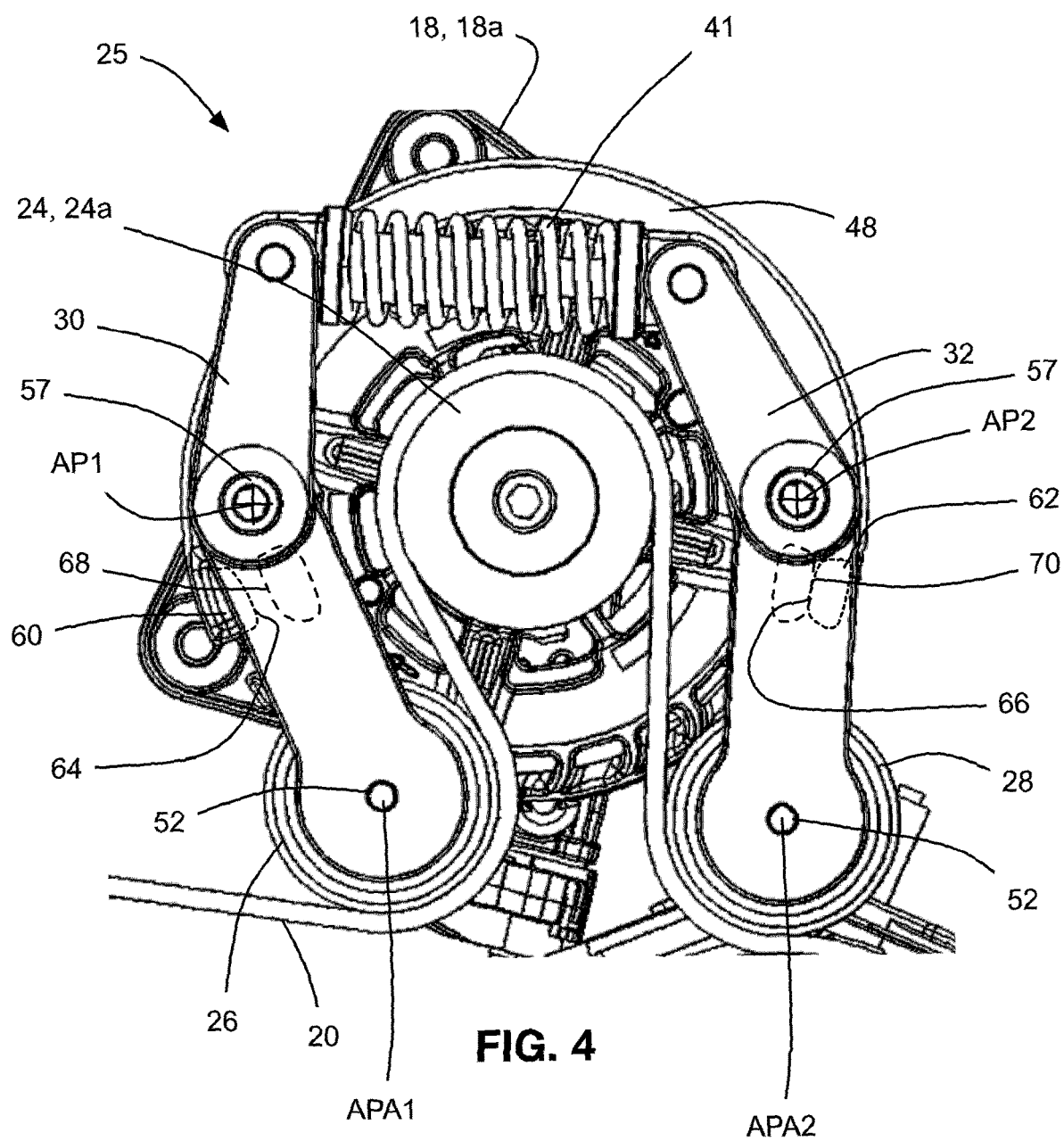
FIG. 4 is a plan view of the endless drive arrangement shown in FIG. 1, operating in a first mode.

A tensioner 25 for the endless drive arrangement 10 is shown in FIG. 1. A first tensioner pulley 26 is rotatably mounted on a first tensioner arm 30 for rotational movement of the pulley about a first arm pulley axis APA1 (FIG. 4). A second tensioner pulley 28 is rotatably mounted on a second tensioner arm 32 for rotational movement of the pulley about a second arm pulley axis APA2. The rotational mounting to each tensioner arm 30 and 32, may be provided by a shoulder bolt 52 that passes through an aperture in each tensioner arm 30 and 32 and into a threaded aperture in the respective pulley 26 or 28.

The first and second tensioner arms 30 and 32 are pivotally mounted to a base 48 for pivotal movement about first and second tensioner arm pivot axes AP1 and AP2, respectively. An example of a pivot structure for permitting the pivotal mounting is shown at 160 in FIG. 5, and includes a bushing 162 and a pair of thrust washers 164 that axially surround the bushing 162. The bushing 162 and thrust washers 164 mount about a pivot shaft 172 on the base 48.

A damping structure 165 provides a selected amount of damping during movement of the first tensioner arm 30. The damping structure 165 includes one or more spring washers 166, a spring washer support 168 and a front plate 170. The aforementioned damping structure elements 166 and 168 may be mounted in a surrounding relationship with the pivot shaft 172 on the base 48, while the front plate 170 is secured to the free end of the pivot shaft 172 via the shoulder bolt shown at 57 or other suitable fastening member to hold the aforementioned elements in place.

The damping provided by the damping structure 160 is constant damping, in the sense that it does not change in magnitude with the position of the first tensioner arm 30. However, damping structures may be provided that do provide damping that varies with the position of the tensioner arm 30, and/or with the direction of travel of the arm 30.

The base 48 mounts fixedly to the housing of the MGU 18a or any other suitable stationary member.

The first and second tensioner pulleys 26 and 28 are biased in first and second free arm directions (shown in FIG. 1 at DFA1 and DFA2 respectively). More specifically, a tensioner biasing member 41 may be positioned to apply a tensioner biasing force F on the first and second tensioner arms 30 and 32 in the respective first and second free arm directions DFA1 and DFA2.

The tensioner biasing member 41 may have any suitable structure, such as, for example, a linear helical compression spring that extends between the first and second tensioner arms 30 and 32. In an alternative embodiment, shown in FIG. 2, the tensioner biasing member 41 may, for example, be a torsion spring that abuts first and second drive surfaces 43 and 45 on the first and second arms 30 and 32 and urges the arms 30 and 32 in directions to drive the first and second tensioner pulleys 26 (shown partially in FIG. 2) and 28 (not shown in FIG. 2) into the belt 20.

Figure 2:
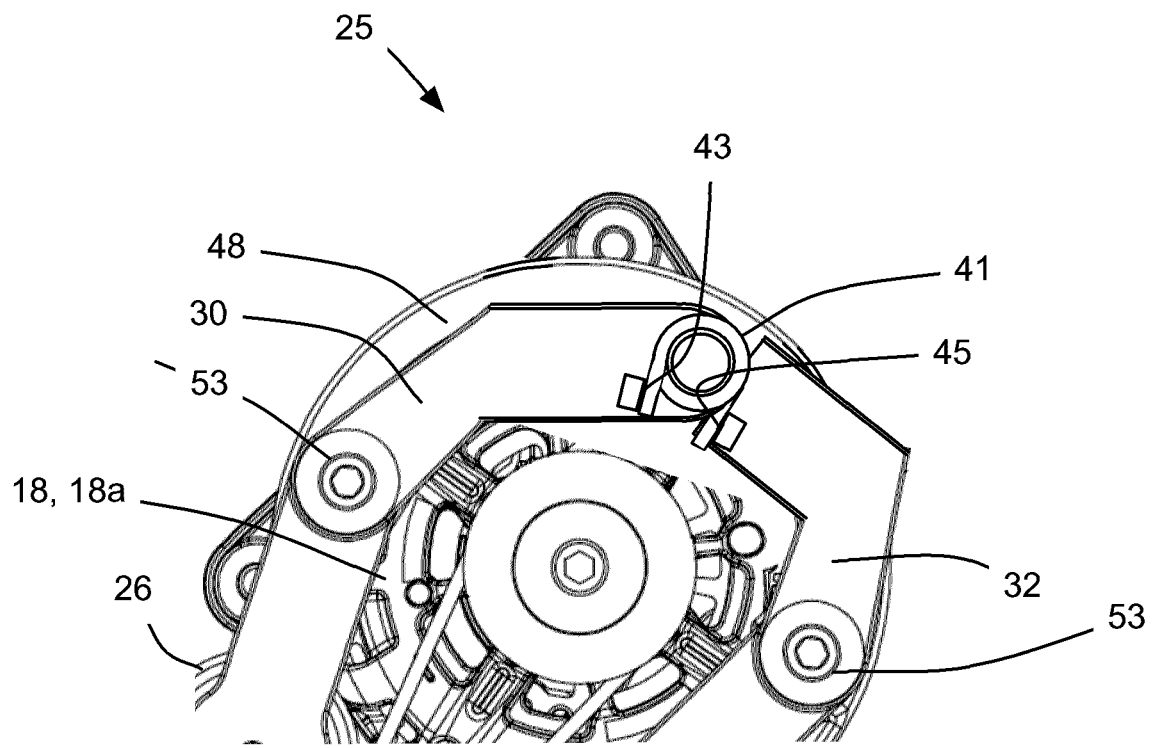
FIG. 2 is a plan view of a variation of the endless drive arrangement shown in FIG. 1.

In the embodiments shown in FIGS. 1 and 2, the first tensioner pulley 26 is positioned on a first side of the first tensioner arm pivot axis AP1, in the sense that the tensioner pulley 26, in use, applies a moment in a first rotational direction on the first tensioner arm 30 about the pivot axis AP1 as a result of the tensioner pulley engagement with the belt 20. The tensioner biasing member 41 is positioned to apply the tensioner biasing force F on a second side of the first tensioner arm pivot axis AP1, in the sense that the tensioner biasing member 41 is positioned to, in use, apply a moment in a second rotational direction (that is opposite the first rotational direction) on the first tensioner arm 30 about the pivot axis AP1.

Analogously, the second tensioner pulley 28 is positioned on a first side of the second tensioner arm pivot axis AP2, in the sense that the tensioner pulley 28, in use, applies a moment in a first rotational direction on the second tensioner arm 32 about the pivot axis AP2 as a result of the tensioner pulley engagement with the belt 20, and the tensioner biasing member 41 is positioned to apply the tensioner biasing force F on a second side of the second tensioner arm pivot axis AP2, in the sense that the tensioner biasing member 41, in use, applies a moment in a second rotational direction (that is opposite this immediately aforementioned first rotational direction) on the second tensioner arm 32 about the pivot axis AP2.

Several features of the tensioner 25 may be advantageous and are described further below.

Figure 3:
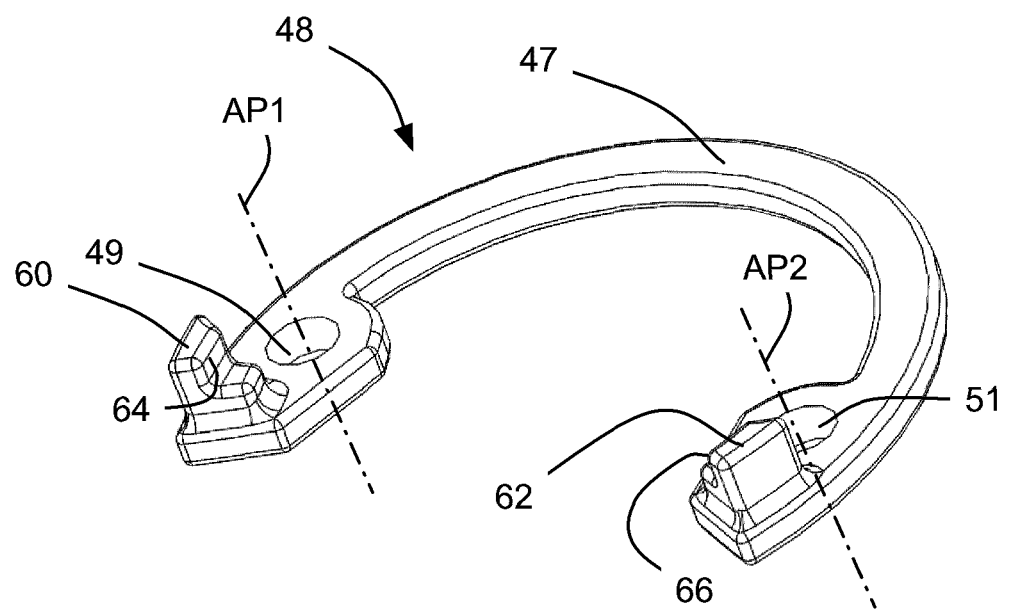
FIG. 3 is a perspective view of an element of the endless drive arrangement shown in FIG. 1.

In an embodiment, the base 48 for the tensioner 25 may be generally C-shaped as shown in FIG. 3. In the embodiment shown in FIG. 3, the base 48 has a base body 47, and first and second mounting apertures 49 and 51 proximate the circumferential ends of the base body 47, wherein the first and second apertures 49 and 51 are configured for mounting the base 28 to the housing of the MGU 18a or another suitable member. The mounting apertures 49 and 51 may also be used to receive pins (shown at 53 in FIGS. 1 and 2) for supporting the pivoting movement of the first and second tensioner arms 30 and 32 and may thus define the first and second pivot axes AP1 and AP2. Furthermore, the opening that is defined by the C-shape of the base 48, is free of any obstructions in an axial direction. As a result, the tensioner 25 is configured to facilitate dissipation of heat from the MGU 18a.

In the embodiment shown in FIG. 4, the tensioner 25 includes a first tensioner arm stop 60 that is positioned to limit the movement of the first tensioner arm 30 in a direction opposite the first free arm direction. The direction opposite the first free arm direction may be referred to as a first load stop direction. The tensioner 25 includes a second tensioner arm stop 62 that is positioned to limit the movement of the second tensioner arm 32 in a direction opposite the second free arm direction (i.e. a second load stop direction). The tensioner arm stops 60 and 62 have first and second base-mounted stop surfaces 64 and 66 respectively that are engageable with first and second arm-mounted stop surfaces 68 and 70 on the first and second tensioner arms 30 and 32 respectively.

The tensioner 25 is configured such that, in use, the second tensioner arm 32 is engaged with the second tensioner arm stop 62 throughout a first selected range of operating conditions (for example, such as when the engine is driving the belt 20 and the MGU 18a is acting as a generator).

Optionally, the tensioner 25 is configured such that, in use, the first tensioner arm 30 is engaged with the first tensioner arm stop 60 throughout a second selected range of operating conditions that is different from the first range of operating conditions (for example, such as when the MGU 18a is driving the belt 20 and is imparting at least about 3 Nm of torque to the belt 20).

Figure 5:
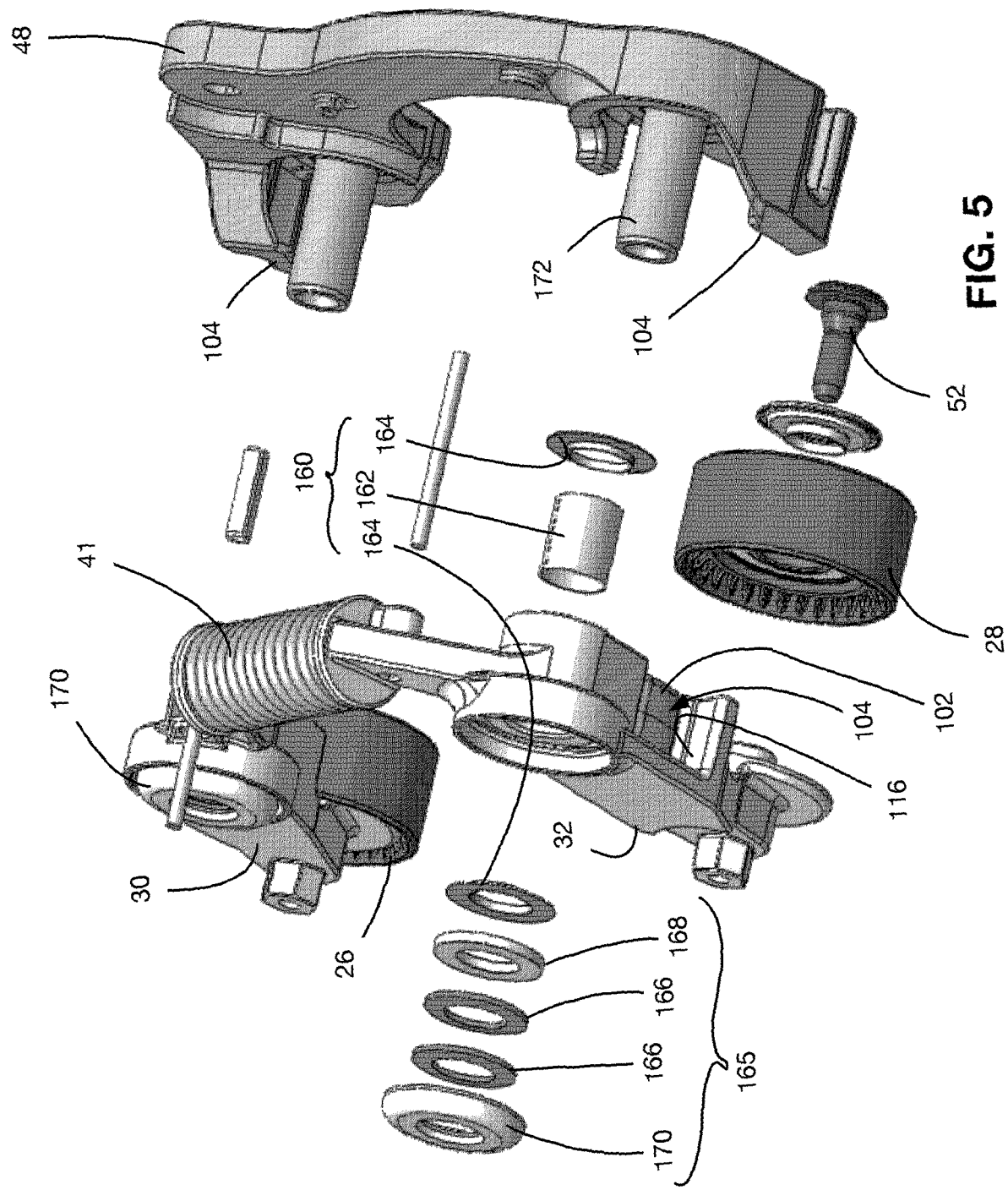
FIG. 5 is a perspective exploded view of a variant of the tensioner shown in FIG. 1.

Reference is made to FIG. 5, which shows an exploded view of a variant of the tensioner 25 in which there is an optional engagement structure for engagement between at least one of the arms 30 and 32 and at least one of the tension arm stops 60 and 62 on the base 48.

In the embodiment shown in FIG. 5, the engagement structure includes a first bumper 102 on one of the base 48 and the first tensioner arm 30, which is engageable with a first travel limiter 104 on the other of the base 48 and the first tensioner arm 30, so as to limit travel of the first tensioner arm 30 in a pivot direction that is opposite to its free arm direction. The free arm direction may be referred to as a first pivot direction for the arm 30, and is the direction in which the arm 30 is biased, while the opposing direction may be referred to as a second pivot direction for the arm 30.

The first bumper 102 and the first travel limiter 104 together have a selected first combined spring rate K1 during engagement with one another. In general, it will be understood that the combined spring rate K1 is a spring rate that is based on the spring rate of the bumper 102 and the spring rate of the travel limiter 104. In the embodiment shown, and as discussed below, the travel limiter 104 may be made from a relatively hard material (such as a metallic material from which the base 48 is made), while the bumper 102 may be made from a much softer material (such as a suitable polymeric material). As a result, the combined spring rate K1 may effectively be the spring rate of the bumper 102. Alternatively, however, it is possible to form a bumper and a travel limiter out of materials that are harder than the polymeric materials described below for bumper 102, but are less hard than the metallic material described for the travel limiter, taking care that their combined spring rate is the same is for the embodiment shown in FIG. 5.

In some embodiments the first combined spring rate K1 increases progressively with increasing compression between the bumper 102 and the travel limiter 104. The term 'compression between the bumper 102 and the travel limiter 104' is intended to take into account both the possibility that the bumper 102 is much softer than the travel limiter 104 and therefore will undergo substantially of the compression that occurs during engagement therewith, and the possibility that the bumper 102 and the travel limiter 104 both have similar hardnesses and therefore both undergo similar amounts of compression during engagement with one another.

In some embodiments, an average combined spring rate (identified as K1avg) over a first millimeter of compression between the bumper 102 and the travel limiter 104 may be less than about 4000 N/mm. The average combined spring rate K1avg may be determined by determining the difference in the spring force that occurs between first and second amounts of compression between the bumper 102 and the travel limiter 104. In some other the average combined spring rate K1avg may be less than about 10000 N/mm over a first millimeter of compression. The provision of a combined spring rate that increases progressively is advantageous in that it can increase the operating life of the tensioner 25, and can reduce hubloads associated with operation of the tensioner 25 and the endless drive arrangement 10 (FIG. 1).

In the example shown, the first bumper 102 may be an element made of a thermoplastic polyester elastomer (TPC-ET), as provided under the trademark Hytrel® by E. I. du Pont de Nemours and Company, or under the trademark Arnitel® by Koninklijke DSM N.V.). Other materials that may be used include natural rubber, or closed cell foam. The first travel limiter 104 may be a metallic projection that is formed on the base 48. As a result, given the very large difference in stiffnesses between the bumper 102 and the limiter 104 in the example shown, the combined spring rate K1 may effectively be the spring rate of the bumper 102.

Figure 6:
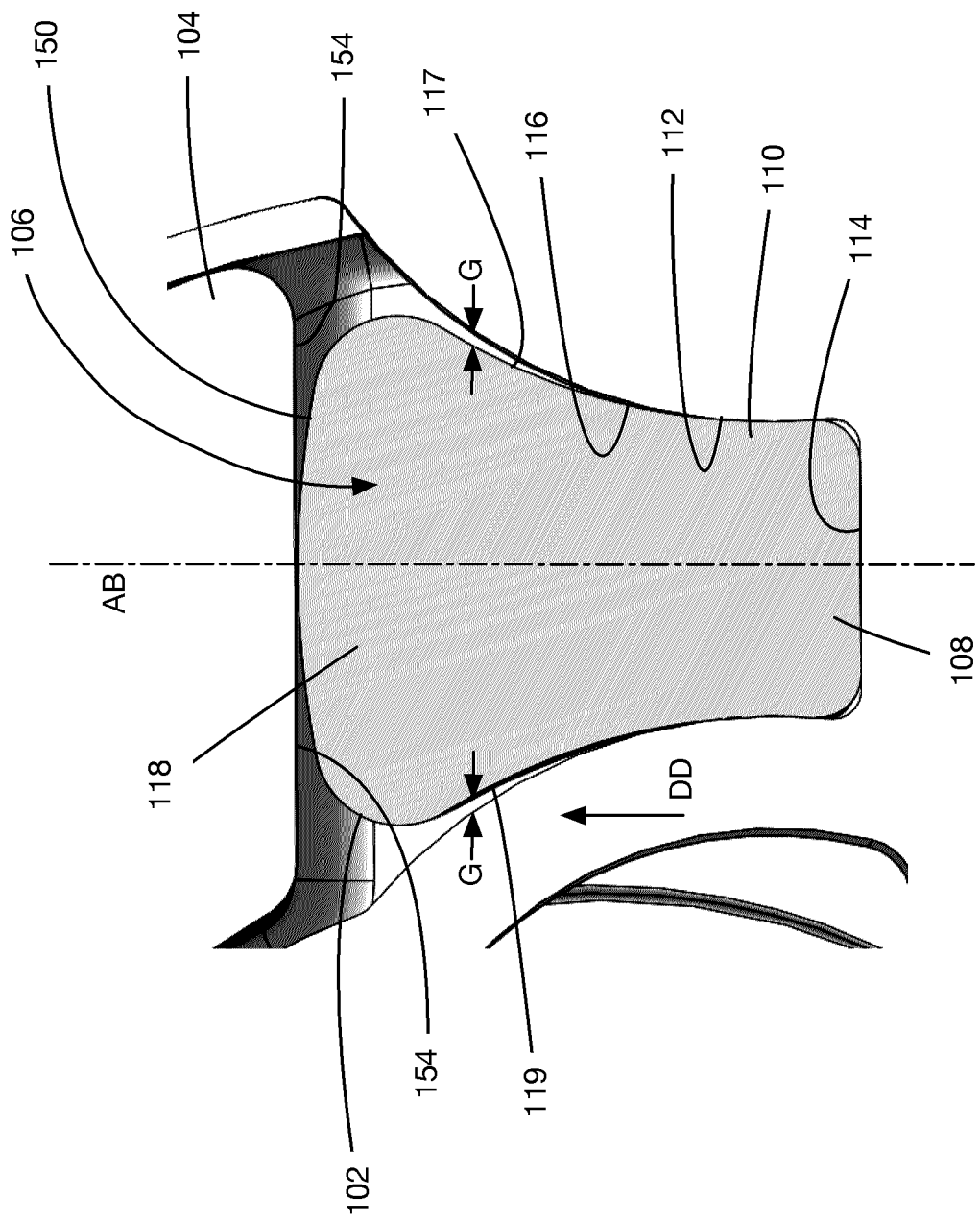
FIG. 6 is a sectional view of a portion of the tensioner shown in FIG. 5 including a bumper and a travel limiter.

Referring additionally to FIG. 6, the first bumper 102 may be held in a first bumper receptacle 106, and has a longitudinal axis AB. The first bumper 102 has a proximal portion 108 that is captured in the first bumper receptacle 106. For example, the proximal portion 108 may have a pinched portion 110 that fits in a portion of the receptacle 106 that projects laterally inwardly slightly (shown at 112). Alternatively, the proximal portion 108 may be captured in the first bumper receptacle 106 by friction, or by any other suitable structure or method.

In the embodiment shown, the bumper 102 has a generally rectangular cross-sectional shape, although other cross-sectional shapes for the bumper 102 may be used, such as a round cross-sectional shape. Referring to FIG. 6, the first bumper receptacle 106 has a bottom 114 and a side wall 116. The side wall 116 may have a generally rectangular shape to at least partially match the shape of the first bumper 102.

In addition to the proximal portion 108 referred to above, the first bumper 102 has a distal portion 118, which is spaced laterally from the side wall 116 of the first bumper receptacle 106 by a gap G that is sized to limit lateral growth of the first bumper 102 during compression of the first bumper 102. In the example shown, the gap G is provided on two side faces (shown at 117 and 119) of the first bumper 102, however it is alternatively possible for the gap G to be provided on one side face of the bumper 102 only, or, for example, all the way around the first bumper 102.

Figure 8C:
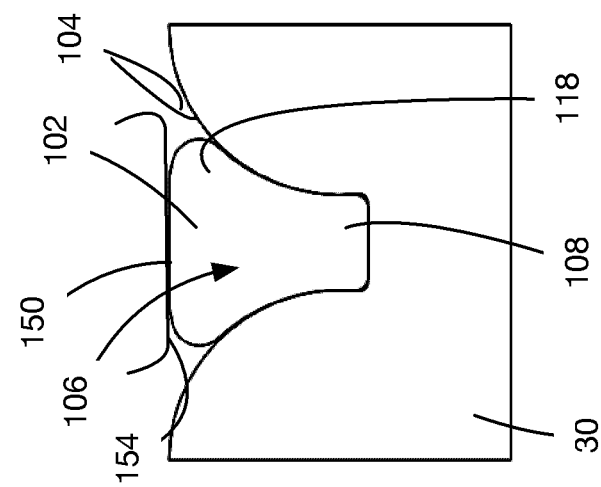
FIGS. 8A-8C are sectional views illustrating the progression of engagement between the bumper and the travel limiter shown in FIG. 6.
Figure 8B:
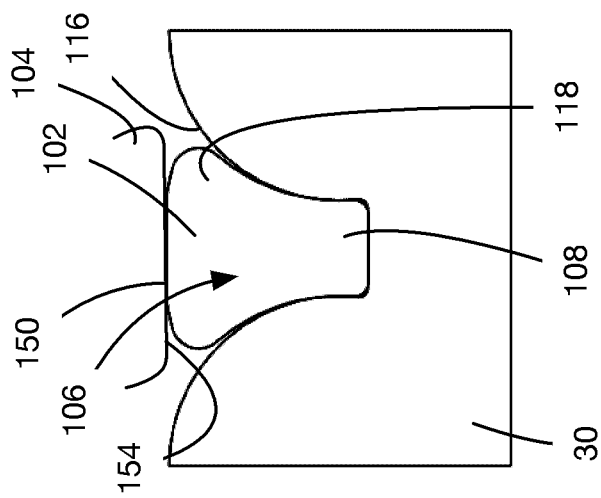
Figure 8A:
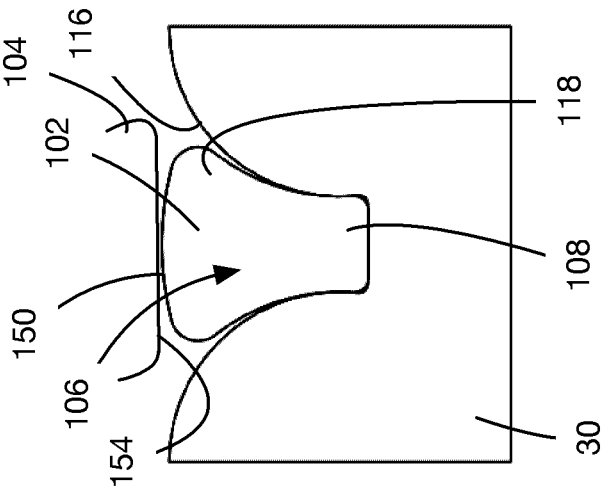

As can be seen in FIG. 6, the gap G increases in a distal direction. Put another way, the side wall 116 of the first bumper receptacle 106 is spaced progressively farther laterally from the first bumper 102 in the distal direction DD. The distal direction is shown by arrow DD. As a result, the engagement of the first bumper 102 with the side wall 116 is progressive, rather than all-at-once. The progressive engagement of the first bumper 102 with the side wall 116 is illustrated in FIGS. 8A-8C, where FIG. 8A represents the first bumper 102 and the side wall 116 when there is no engagement (and therefore no compression force) between the first bumper 102 and the first travel limiter 104; FIG. 8B represents the first bumper 102 and the side wall 116 when there is a first, small amount of compression force between the first bumper 102 and the first travel limiter 104; and FIG. 8C represents the first bumper 102 and the side wall 116 when there is a second, larger amount of compression force between the first bumper 102 and the first travel limiter 104. As can be seen in FIGS. 8A-8C, as the compressive force increases between the bumper 102 and travel limiter 104, the amount of engagement between the bumper 102 and the side wall 116 increases progressively.

Figure 9:
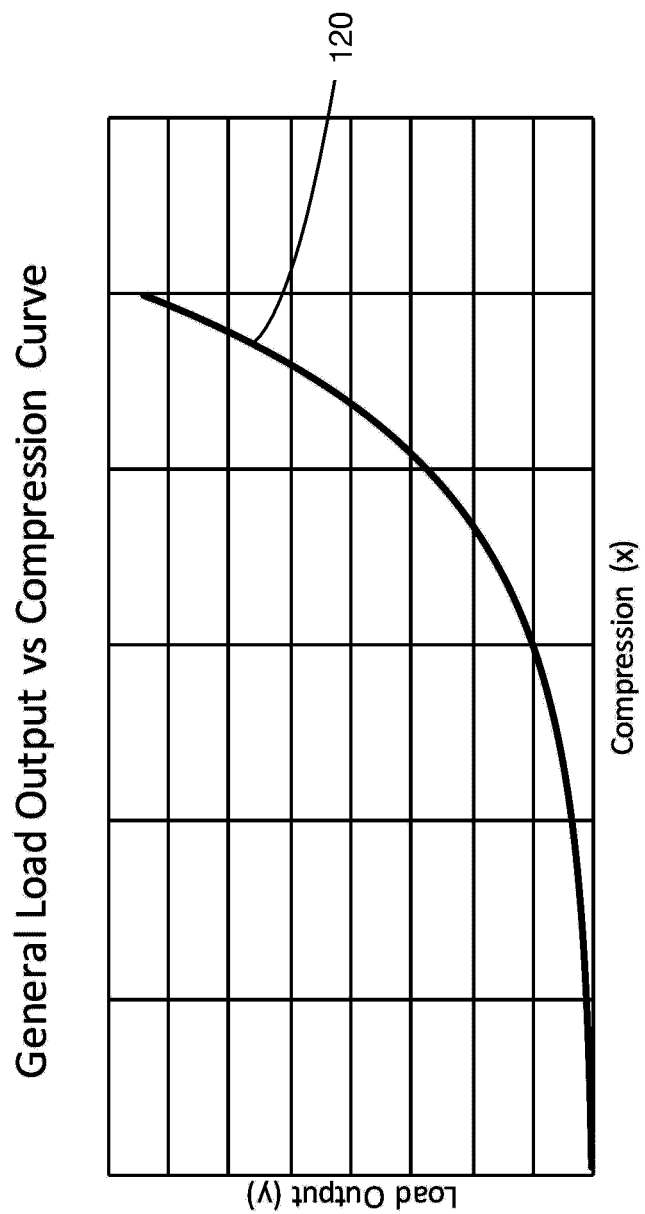
FIG. 9 is a graph showing the relationship between the force output of the bumper in relation to the amount of compression of the bumper.

The progressive engagement results in a progressive increase in the spring rate of the first bumper 102, and therefore a progressive increase in the spring rate of the first combined spring rate K1 between the first bumper 102 and the first travel limiter 104. FIG. 9 shows a curve 120 that represents the increase in spring force applied by the bumper 102 during compression. As can be seen, the spring force curve 120 increases in a non-linear manner. It will be understood by one skilled in the art that the spring rate of the bumper (and therefore the spring rate K1) is directly related to the derivative of the spring force curve 120. It will, therefore, be understood that the progressive, non-linear increasing nature of the spring force curve 120 translates into a progressively increasing spring rate, during compression of the bumper 102. In the example shown in FIG. 9, the spring force curve 120 follows the formula:

$$y = e^{ax}$$

where:
y=spring force;
x=compression distance (i.e. the amount of compression); and
a=curvature constant defined by material properties of the bumper 102 and the geometry of the receptacle 106.

It will be understood that the spring rate, which varies with the derivative of the above expression, will increase progressively and exponentially. By contrast, a typical bumper, if made from a hard material such as a metal, will exhibit a very high, constant spring rate, which can directly result in high peak hubloads on the various pulleys of the tensioner and the accessories near the tensioner (such as the MGU 18a shown in FIG. 1). Alternatively, if a bumper was formed from a very soft material in order to maintain a constant, low spring rate in an effort to avoid high peak hubloads, the bumper would have to very long in order to undergo the large amount of compression necessary to reach equilibrium with the force of the tensioner arm 30 pushing against it. Such a large amount of compression may not always be practical however, as the tensioner arm 30 may only be contemplated to undergo a certain amount of movement for several reasons, or because of possible interference issues with other equipment.

Figure 10:
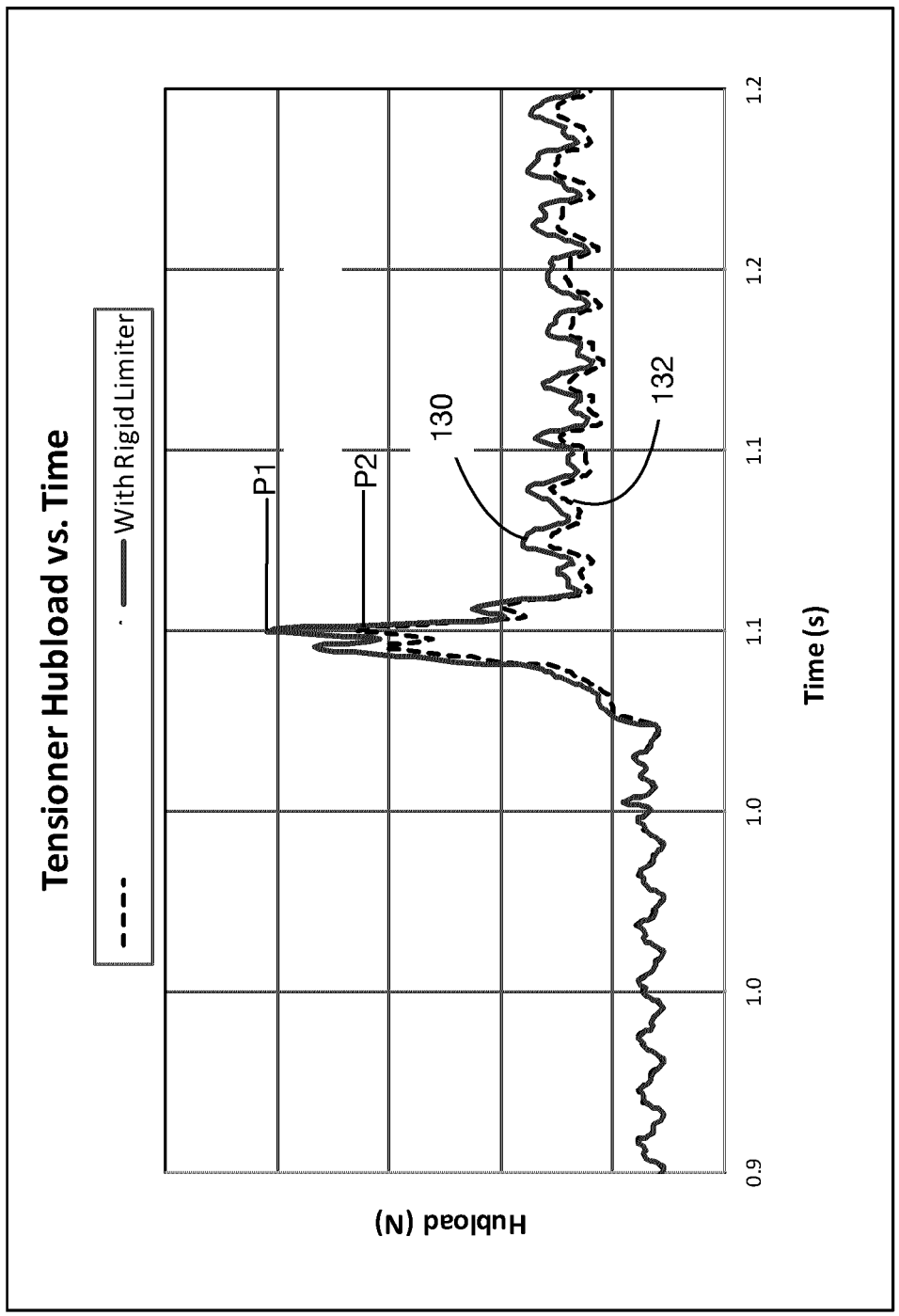
FIG. 10 is a graph showing the relationship between the hubload generated over time during a test cycle, with the tensioner shown in FIG. 5, and with a tensioner that does not employ the bumper and travel limiter shown in FIG. 6, for comparison.

By providing a progressively increasing combined spring rate K1, the tensioner arm 30 is subjected to less shock, and the severity of any hubload spikes that can occur during engagement between the first bumper 102 and the first travel limiter 104 are reduced. FIG. 10 shows a comparative graph representing hubload versus time during a test cycle, using a tensioner with the bumper 102 and the travel limiter 104 (represented by curve 130) and using a tensioner with two hard (e.g. metallic) engagement members to limit travel of the tensioner arm (represented by curve 132). Points P1 and P2 represent the points of highest peak hubloads for the two curves 130 and 132. As can be seen, the hubload at P2 is approximately 20% lower than the hubload at P1. As can also be seen, the overall hubload throughout the test cycle is lower as a result of using the bumper 102 and the travel limiter 104.

While it may be possible to provide bumpers made from a material that compresses in a non-linear way so as to provide the aforementioned progressively increasing spring rate it has been found that such bumpers, if unsupported on their sides tend to have relatively short operating lives and to exhibit progressively degrading performance. Such bumpers can, for example, incur, relatively high tensile and shear stresses along their sides as their billet during compression. By providing the receptacle 106 with the side wall 116 with the progressively increasing gap G, the bumper 102 is supported along its side faces 117 and 119, thereby reducing the aforementioned high tensile and shear stresses while providing a progressively increasing spring rate. For situations where a bumper that is unsupported on its sides nonetheless provides an acceptable operating life, it is contemplated that such a bumper could be used in the present tensioner instead of the bumper 102.

Figure 11:
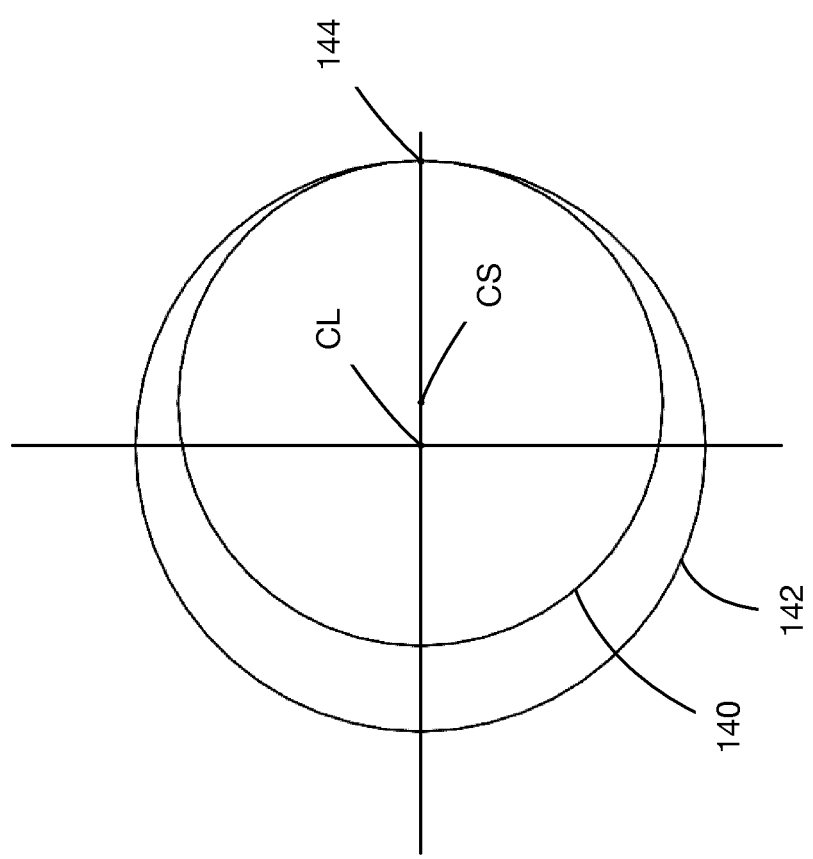
FIG. 11 is a diagram showing two circles that is used to model the size of a gap between a side wall of a receptacle for the bumper and a side face of the bumper.

As can be seen in FIGS. 8A-8C, the size of the gap G increases greater-than-linearly (i.e. in a greater-than-linear manner). In a particular example, a mathematical way of representing the increase in the size of the gap G is the difference in the X coordinate values of points on two circles which have tangency to one another at a point. Graphically, this is shown in FIG. 11. A first, smaller circle 140 and a second, larger circle 142 are shown. The two circles 140 and 142 have tangency at one point shown at 144. The larger circle 142 has a radius RL and the smaller circle 140 has a radius RS. An X-Y coordinate system is shown where the larger circle 140 has a center CL that on the origin. The smaller circle is centered on a point CS that is offset from the origin along the X axis by a distance DX from the origin along the X axis, where DX is equal to the difference in the radii RL and RS. The gap G between the side wall 116 and the side face 117 or 119 of the bumper 102 in FIG. 6 (or FIG. 8A) can be represented by the difference in the X coordinate values of points along the two circles 140 and 142 at a given angle. A formula that represents this difference is:

$$G = RL \times \cos(TH) - (RS \times \cos(TH) + DX)$$

where:
G is the size of the gap;
RL is the radius of the larger circle, as noted above;
RS is the radius of the smaller circle, as noted above;
TH is the angle being used to arrive at the value of the gap; and
DX is the difference between the radius of the larger circle and that of the smaller circle, as noted above.

It will be understood that $RL \times \cos(TH)$ is the X coordinate value for the point on the large circle at any angle TH.

It will be understood that $RS \times \cos(TH) + DX$ is the X coordinate value for the point on the small circle at any angle TH.

Thus, the formula above is derived, where the size of the gap G is the difference between these two X coordinate values.

Figure 12A:
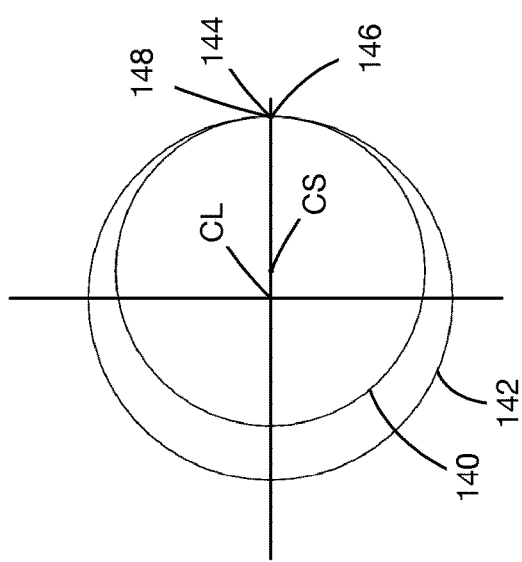
FIGS. 12A-12C are diagrams showing the two circles shown in FIG. 11, that are used to calculate the size of the gap at different points on the side wall and bumper.
Figure 12C:
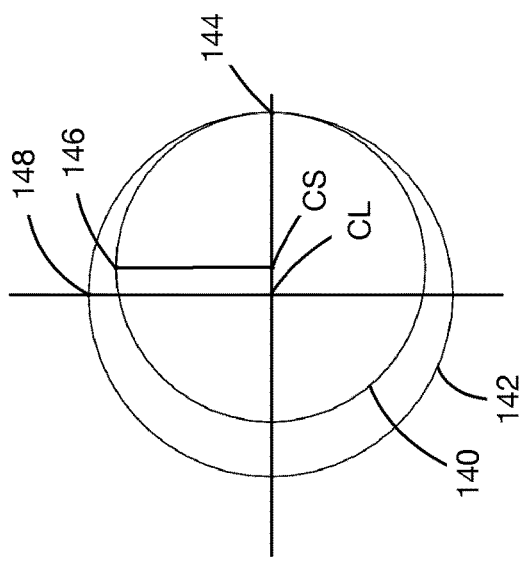
Figure 12B:
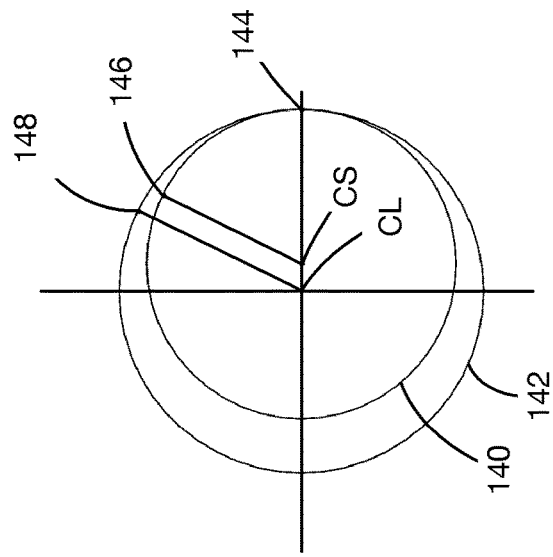

FIGS. 12A, 12B and 12C represent three different places for the determination of the gap. FIG. 12A shows points 146 and 148 on the small and large circles 140 and 142, when TH=0 degrees. When TH=0 degrees, the X value of the point on the large circle 142 is RL×cos (0) which equals RL. When TH=0 degrees, the X value of the point on the small circle is RS×cos(0)+DX, which also equals RL. Thus, the size of the gap G at an angle TH of 0 degrees is 0.

FIG. 12B shows points 146 and 148 on the small and large circles 140 and 142, when TH=30 degrees. When TH=60 degrees, the X value of the point on the large circle 142 is RL×cos (60) which equals 0.5RL. When TH=60 degrees, the X value of the point on the small circle is RS×cos(60)+DX, which equals 0.5RS+DX. Thus, the size of the gap G at an angle TH of 60 degrees is 0.5RL−0.5RS−DX. Since DX itself=RL−RS, the previous expression 0.5RS−0.5RL. It will be noted that, since the value of RL is larger than the value of RS, the value for the aforementioned expression will be less than zero. The fact that it is less than zero can be ignored, however. In other words, one can take the absolute value of the result of the expression, to obtain a positive value for the size of the gap G.

FIG. 12C shows points 146 and 148 on the small and large circles 140 and 142, when TH=30 degrees. When TH=90 degrees, the X coordinate value of the point on the large circle 142 is RL×cos (90) which equals 0. When TH=90 degrees, the X coordinate value of the point on the small circle is RS×cos(60)+DX, which equals DX. Thus, the size of the gap G at an angle TH of 90 degrees is −DX, which can be revised to be DX if a positive number as noted above.

As described above, the sides 117 and 119 of the bumper 102 and the side wall 116 of the receptacle 106 may have arcuate profiles such that the above-noted expression defines the gap G between them. Alternatively, however, the profiles of the sides 117 and 119 of the bumper 102 and the side wall 116 may have profiles that are arcuate and that have a gap G that increases according to other a different mathematical expression than the one described above.

The radii of the circles 140 and 142 may have be any suitable radii and will depend on such things as the compression forces involved between the bumper 102 and the travel limiter 104, the material of construction for the bumper 102 and other factors. In an example, the radius of the smaller circle 140 may be between about 9 mm and about 47 mm, and the radius of the larger circle 142 may be between about 12 mm and about 50 mm, with the radius of the larger circle 142 being selected to be between about 0.5 mm and about 10 mm larger than the radius of the smaller circle.

Figure 7:
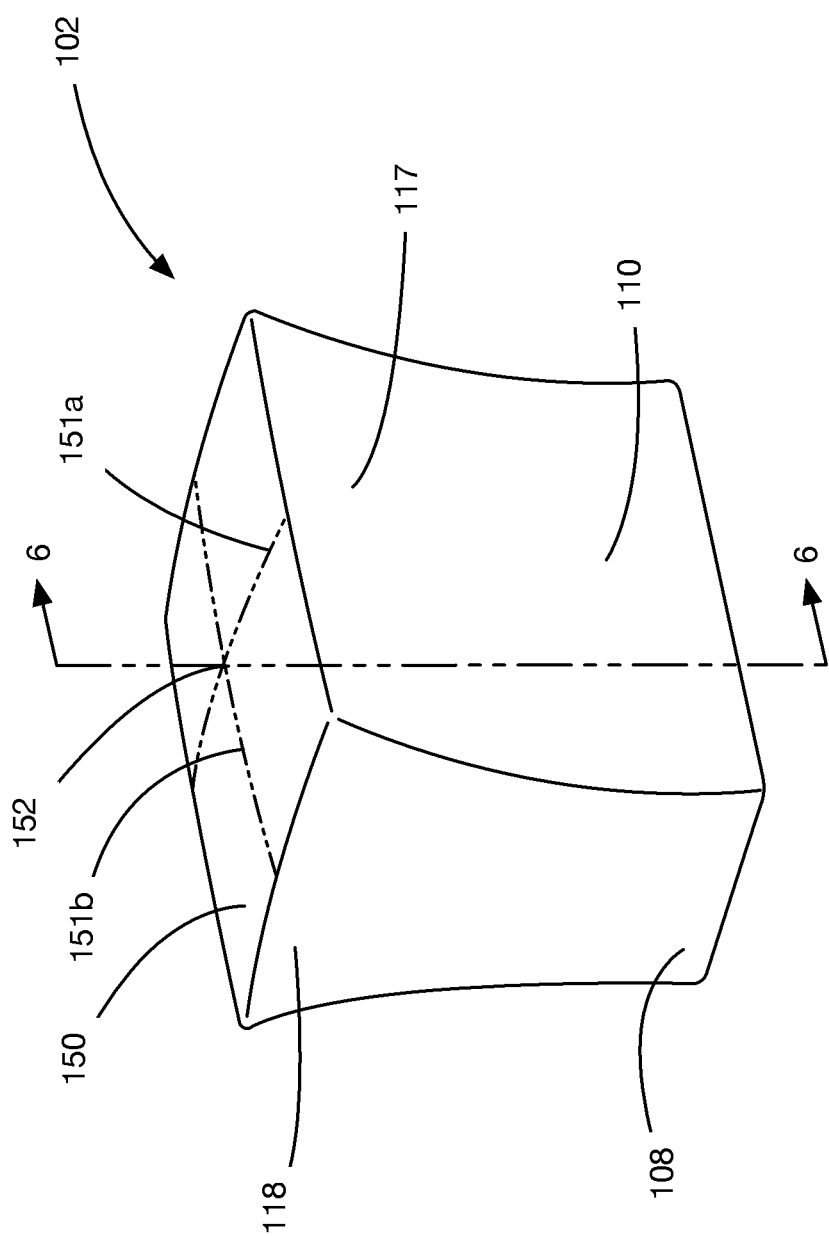
FIG. 7 is a perspective view of the bumper shown in FIG. 6.
Figure 13B:
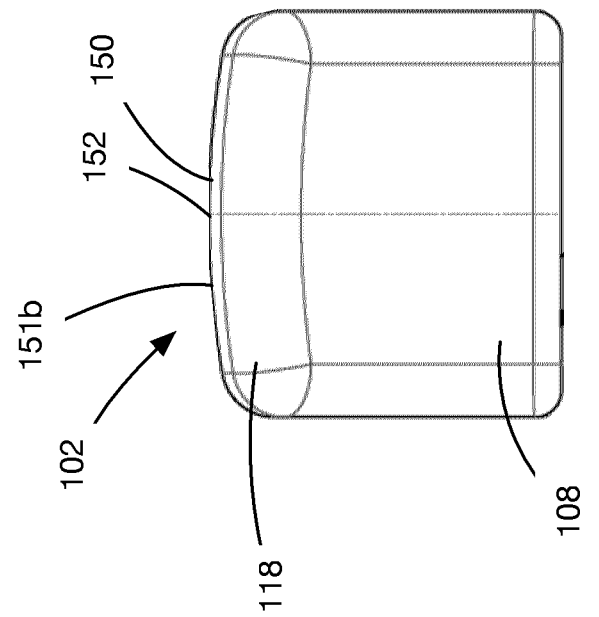
FIGS. 13A and 13B are side and end views of the bumper.
Figure 13A:
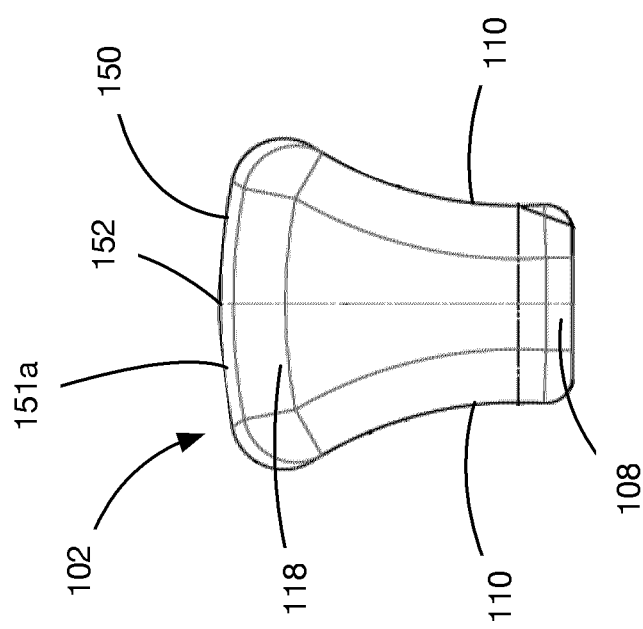

In addition to, or instead of, the progressively increasing gap G between the side faces 117 and 119 and the side wall 116 of the receptacle, the bumper 102 may have another structure that provides a progressively increasing spring rate K1, as shown in FIGS. 13A and 13B. As can be seen in FIG. 13A (and also in FIG. 7), the bumper 102 may have a distal face 150 that has an arcuate profile 151a in a first lateral-axial plane. Furthermore, as shown in FIG. 13B (and also in FIG. 7), the distal face 150 may have an arcuate profile 151b in a second lateral-axial plane that is orthogonal to the first lateral-axial plane shown in FIG. 13A. Thus, if the distal face 150 is arcuate in both of these planes, the distal face 150 has a peak 152 which, in the embodiment shown, makes a substantially point contact with the travel limiter 104 during initial engagement therewith. Further compression of the bumper 102 by the travel limiter 104 results in a progressive increase in the area of contact between the bumper 102 and the travel limiter 104. The progressive increase in the area of contact, results in a progressively increasing proportion of the bumper 102 being compressed, which thereby increases the effective spring rate for the bumper 102. In addition to contributing to a progressively increasing spring rate for the bumper 102, the provision of a distal face 150 that provides an initial point contact and that provides a progressively increasing area of contact also contributes to reducing any impact noise between the bumper 102 and the travel limiter 104. Due to the arcuate shape in both the first and second lateral-axial planes the area of contact increases in two axes and therefore increases exponentially with the amount of compression between the bumper 102 and the travel limiter 104. The degree of arc to the profiles 151a and 151b along the first and second lateral-axial planes may be selected individually to control the rate of increase of the spring rate K1 and the spring force. In an example, the profile 151a may have a generally circular arcuate shape with a radius of between about 10 mm and about 60 mm, and the profile 151b may have a generally circular arcuate shape with a radius of between about 20 mm and about 80 mm.

The peak 152 may be in the form of a single maximally distal point on the distal face 150, as is the case shown in the figures, thereby generating the aforementioned substantially point contact initially with the travel limiter 104, or it may be in the form of a plateau having an area of equal distality, such that the entire plateau engages simultaneously during initial engagement between the bumper 102 and the travel limiter 104.

As can be seen in FIGS. 8A-8C, the travel limiter face (shown at 154) of the travel limiter 104 that engages the distal face 150 of the bumper 102 may be planar or is, in any case, shaped to initially engage the distal face 150 substantially as a point contact, and to permit the increasing area of contact as described above.

The above description has been focused on the engagement structure between the first tensioner arm 30 and the base 48. The second tensioner arm may employ an engagement structure that is substantially identical to the tensioner structure shown above, and may therefore have a second bumper 102 that engages a second travel limiter 104 on the base. The bumper 102 on the second tensioner arm 32 may be identical to the bumper 102 on the first tensioner arm 30, or it may be modified slightly to provide a different spring force/compression curve 120 that is selected based on the compression forces that will be incurred between the second bumper 102 on the second tensioner arm 32 and the travel limiter 104 on the base 48 for engagement with the second bumper 102.

The operation of the tensioner 25 may be similar to the operation of the tensioner described in US patent application publication US20170074375A1, the contents of which are incorporated herein by reference in their entirety. The tensioner 25 may have the second tensioner arm 32 with its bumper 102 against its associated travel limiter 104 in certain situations, such as when the crankshaft is driving the belt 20 and the MGU 18a is operated as a generator. The tensioner 25 may have the first tensioner arm 30 with its bumper 102 against its travel limiter 104 in other situations such as when the MGU 18a is operated as a motor and imparts at least a selected amount of torque (e.g. 3 Nm) to the belt 20. By providing the engagement structure described in reference to FIGS. 5-13B (e.g. the bumper 102 and the travel limiter 104), the peak hubloads are reduced for the endless drive arrangement shown in FIG. 1.

In another embodiment, a method is provided for reducing peak hubloads on an endless drive arrangement for an engine, including a belt, a crankshaft that is driven by the engine to drive the belt, at least one accessory that is driven by the belt, and a tensioner including a base, a first tensioner arm that is movable relative to the base, a first pulley rotatably mounted on the tensioner arm and a tensioner biasing member that biases the first tensioner arm in a first free arm direction, the method comprising:

a) providing a first bumper on one of the base and the first tensioner arm;
b) providing a first travel limiter on the other of the base and the first tensioner arm; and
c) moving the first tensioner arm relative to the base in a direction opposite to the first free arm direction, such that the bumper and the travel limiter engage one another, wherein the first bumper and the first travel limiter together have a selected first combined spring rate during engagement with one another, wherein the first combined spring rate increases progressively with compression between the first bumper and the first travel limiter.

In the embodiments described herein, the arm 30 is referred to as the first tensioner arm, and the arm 32 is referred to as the second tensioner arm. With respect to the optional engagement structure described below, the arm 30 is also referred to as the first tensioner arm 30 and the arm 32 is also referred to as the second tensioner arm 32. However, it will be understood that, at least with respect to the optional engagement structure described below, the arm 30 may alternatively be the second tensioner arm and the arm 32 may be the first tensioner arm. In a further alternative, a tensioner having the optional engagement structure may have a single tensioner arm, which could be similar to the tensioner arm 30 or the tensioner arm 32, or which could alternatively be similar to other types of tensioner arm. In embodiments in which there is only one tensioner arm, the tensioner arm may nonetheless be referred to as a first tensioner arm.

While the description contained herein constitutes a plurality of embodiments of the present invention, it will be appreciated that the present invention is susceptible to further modification and change without departing from the fair meaning of the accompanying claims.

The invention claimed is:

1. A tensioner for tensioning a belt in an engine, comprising:
    a base that is mountable to a stationary member;
    a first tensioner arm that is pivotably connected to the base, wherein the first tensioner arm is biased in a first pivot direction for the first tensioner arm;
    a first bumper on one of the base and the first tensioner arm, which is engageable with a first travel limiter on the other of the base and the first tensioner arm to limit travel of the first tensioner arm in a second pivot direction for the first tensioner arm; and
    a first pulley rotatably mounted to the first tensioner arm and positioned to engage a first section of the belt,
    wherein the first bumper and the first travel limiter together have a selected first combined spring rate during engagement with one another, wherein the first combined spring rate increases progressively with compression between the first bumper and the first travel limiter,
    wherein the first bumper has a proximal portion that is captured in a first bumper receptacle, and a distal portion on which there is a distal face that is engageable with the first travel limiter to limit travel of the first tensioner arm in a second pivot direction for the first tensioner arm, wherein the first bumper has a longitudinal axis extending from the proximal portion to the distal face, and
    wherein the distal portion is spaced laterally from a side wall of the first bumper receptacle by a gap sized to limit lateral growth of the first bumper during compression of the first bumper.

2. A tensioner as claimed in claim 1, wherein the gap increases in size in a distal direction.

3. A tensioner as claimed in claim 2, wherein the side wall is arcuate and a side face of the bumper from which the side wall is spaced laterally, is arcuate.

4. A tensioner as claimed in claim 1, wherein an average combined spring rate over a first millimeter of compression between the first bumper and the travel limiter is less than about 4000 N per mm.

5. A tensioner as claimed in claim 1, wherein the first bumper has a distal face and the first travel limiter has a travel limiter face that is initially engageable with the distal face over a first contact area of the distal face, and which engages a progressively increasing area of contact of the distal face during increasing compression between the first bumper and the first travel limiter.

6. A tensioner as claimed in claim 5, wherein the distal face has a peak and is arcuate along a first lateral-axial plane away from the peak.

7. A tensioner as claimed in claim 6, wherein the distal face is arcuate along a second lateral-axial plane away from the peak, wherein the second lateral-axial plane is orthogonal to the first lateral-axial plane.

8. A tensioner as claimed in claim 1, further comprising:
a second tensioner arm that is pivotably connected to the base, wherein the second tensioner arm is biased in a second pivot direction for the second tensioner arm;
a second bumper on one of the base and the second tensioner arm, and which is engageable with a second travel limiter on the other of the base and the second tensioner arm to limit travel of the second tensioner arm in a second pivot direction for the second tensioner arm; and
a second pulley rotatably mounted to the second tensioner arm and positioned to engage a second section of the belt,
wherein the second bumper and the second travel limiter together have a selected second combined spring rate during engagement, wherein the second combined spring rate increases progressively with compression between the second bumper and the second travel limiter.

9. A tensioner for tensioning a belt in an engine, comprising:
a base that is mountable to a stationary member;
a first tensioner arm that is pivotably connected to the base, wherein the first tensioner arm is biased in a first pivot direction for the first tensioner arm;
a first bumper held in a first bumper receptacle on one of the base and the first tensioner arm, and a first travel limiter on the other of the base and the first tensioner arm; and
a first pulley rotatably mounted to the first tensioner arm and positioned to engage a first section of the belt,
wherein the first bumper has a proximal portion that is captured in the first bumper receptacle, a distal portion on which there is a distal face that is engageable with the first travel limiter to limit travel of the first tensioner arm in a second pivot direction for the first tensioner arm, wherein the first bumper has a longitudinal axis extending from the proximal portion to the distal face, and
wherein the distal portion is spaced laterally from a side wall of the first bumper receptacle by a gap sized to limit lateral growth of the first bumper during compression of the first bumper,
and wherein the gap increases in size in a distal direction.

10. A tensioner as claimed in claim 9, wherein the gap increases greater-than-linearly in size in the distal direction.

11. A tensioner as claimed in claim 10, wherein the side wall is arcuate and a side face of the bumper from which the side wall is spaced laterally, is arcuate.

12. A tensioner as claimed in claim 9, wherein the first travel limiter has a travel limiter face that is initially engageable with the distal face over a first contact area of the distal face, and which engages a progressively increasing area of contact of the distal face during increasing compression between the first bumper and the first travel limiter.

13. A tensioner as claimed in claim 12, wherein the distal face has a peak and is arcuate along a first lateral-axial plane away from the peak.

14. A tensioner as claimed in claim 13, wherein the distal face is arcuate along a second lateral-axial plane away from the peak, wherein the second lateral-axial plane is orthogonal to the first lateral-axial plane.

15. A method for reducing peak hubloads in an endless drive arrangement for an engine, including a belt, a crankshaft that is driven by the engine to drive the belt, at least one accessory that is driven by the belt, and a tensioner including a base, a first tensioner arm that is movable relative to the base, a first pulley rotatably mounted on the tensioner arm and a tensioner biasing member that biases the first tensioner arm in a first free arm direction, the method comprising:
a) providing a first bumper on one of the base and the first tensioner arm;
b) providing a first travel limiter on the other of the base and the first tensioner arm; and
c) moving the first tensioner arm relative to the base in a direction opposite to the first free arm direction, such that the bumper and the travel limiter engage one another,
wherein the first bumper and the first travel limiter together have a selected first combined spring rate during engagement with one another, wherein the first combined spring rate increases progressively with compression between the first bumper and the first travel limiter.

\* \* \* \* \*